UNITED STATES PATENT OFFICE 2,536,795

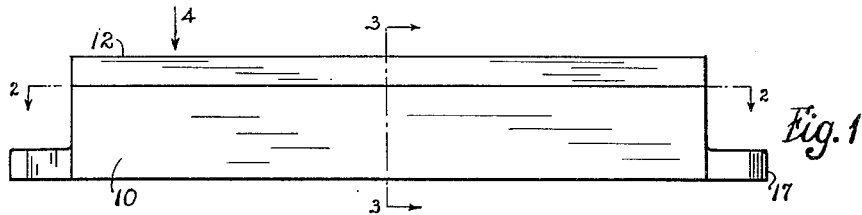
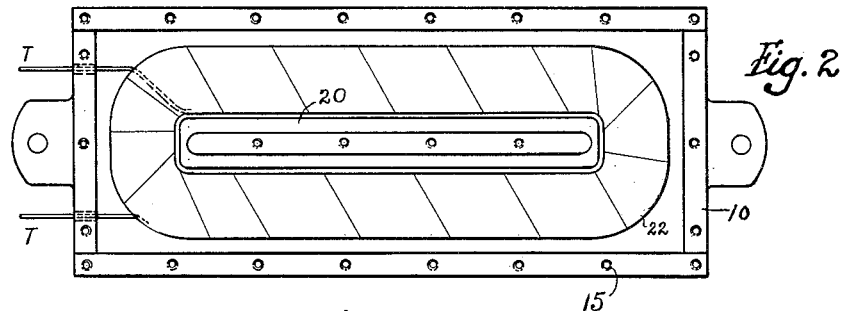
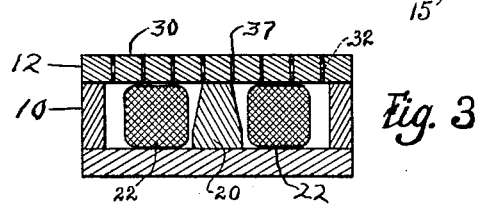
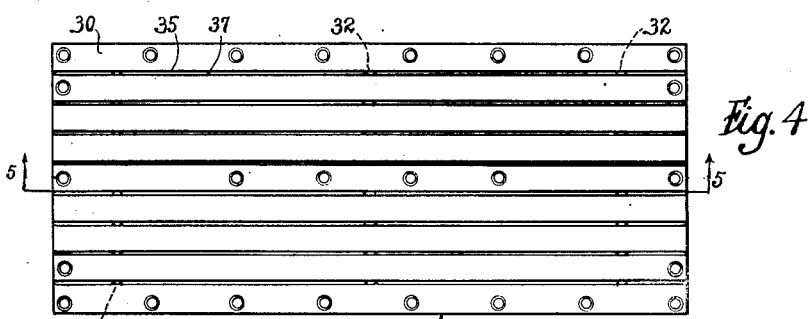
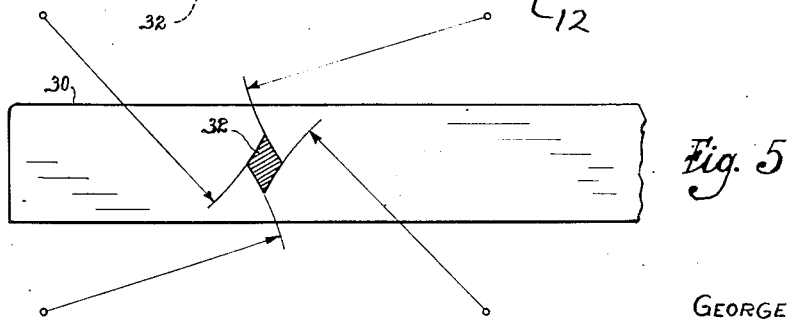

MAGNETIC CHUCK WITH ONE-PIECE TOP PLATE

George J. Carson, West Boylston, Mass.

Application November 19, 1949, Serial No. 128,457

1 Claim. (Cl. 175—367)

This invention relates to a magnetic chuck of the general type commonly used for holding pieces of iron or steel during machine tool operations thereon.

It is the general object of my invention to provide an improved top plate for such a magnetic chuck, in which the upper surface of the plate presents a plurality of longitudinally-extending parallel bars, separated by narrow strips of non-magnetic material.

A further object is to provide a top plate of one-piece construction and in which the parallel bars are joined together by interiorly-disposed integral web portions. I also disclose herein an improved and inexpensive method of forming the top plates with the integral connecting web portions.

My invention further relates to arrangements and combinations of parts which will be hereinafter described and more particularly pointed out in the appended claim.

A preferred form of the invention is shown in the drawings, in which:

Fig. 1 is a side elevation of my improved chuck;

Fig. 2 is a plan view of the chuck with the cover removed;

Fig. 3 is a transverse sectional elevation, taken along the line 3—3 in Fig. 1;

Fig. 4 is a plan view of the top plate; and

Fig. 5 is an enlarged partial sectional side elevation of the top plate, taken along the line 5—5 in Fig. 4.

Referring to the drawings, my improved chuck comprises a body 10 and a top plate 12, suitably secured together by screws extending upward through holes 15 in the base 10. The base 10 may be provided with clamping ears or lugs 17, and preferably has an iron core 20 surrounded by a magnetic coil 22 having terminals T.

The details of construction of the body 10 and the parts enclosed thereby form no part of my present invention and may be of any usual type.

My improved top plate 12 comprises a series of longitudinally-extending parallel bars 30 which are joined together by integral web portions 32 (Fig. 5) and which have the narrow slots 35 between the bars firmly filled with strips 37 of any suitable non-magnetic metal, such as brass or type metal.

The top surface of the top plate 12 thus presents a series of relatively wide iron or steel bars 30, each extending the full length of the plate and separated from each other by interposed narrow strips 37 of non-magnetic material. Such a plate is found to possess superior holding qualities and to maintain its holding power throughout its entire length.

In the manufacture of my improved one-piece top plate, I preferably start with a solid and full-size plate of cast-iron or steel, and then form the slots 35 and the web portions 32 by milling operations, as indicated diagrammatically in Fig. 5. The milling cutters or saws are of relatively small diameter and are raised out of the work at intervals to leave the integral web portions 32. The milling cutters or saws are preferably used in gangs, so that an entire plate may be milled or sawed at a single operation.

My improved top plate thus constructed possesses the advantage of having integral connecting web portions and also the advantage of having the intervening slots of uniform width and uniformly spaced apart.

Having thus described my invention and the advantages thereof, I do not wish to be limited to the details herein disclosed, otherwise than as set forth in the claim, but what I claim is:

In a magnetic chuck, a face plate comprising a plurality of parallel bars of magnetic material which each extend the full length of said plate, a strip of non-magnetic material separating each pair of adjacent bars, and a plurality of connecting portions extending between each pair of adjacent bars and through the intervening strip of non-magnetic material, said connecting portions being of restricted cross section and being integral with and of the same magnetic material as both of said adjacent parallel bars and being substantially spaced apart longitudinally of said bars, and said connecting portions being substantially centered vertically in said plate and being substantially spaced from both the upper and lower surfaces of said face plate.

GEORGE J. CARSON.

REFERENCES CITED

The following references are of record in the file of this patent:

UNITED STATES PATENTS

| Number | Name | Date |
|---|---|---|
| 1,548,793 | Bing | Aug. 4, 1925 |
| 1,895,129 | Jones | Jan. 24, 1933 |
| 2,327,748 | Smith | Aug. 24, 1943 |
| 2,435,737 | Carson | Feb. 10, 1948 |